United States Patent [19]

Omori et al.

[11] Patent Number: 5,418,901
[45] Date of Patent: May 23, 1995

[54] SHADING METHOD AND SHADING APPARATUS FOR COMPUTER GRAPHICS

[75] Inventors: Mutsuhiro Omori, Kanagawa; Norihito Ichikawa, Tokyo; Hidehiro Hirase, Kanagawa; Masatoshi Imai, Tokyo, all of Japan

[73] Assignee: Sony Corporation, Tokyo, Japan

[21] Appl. No.: 302,965

[22] Filed: Sep. 12, 1994

Related U.S. Application Data

[63] Continuation of Ser. No. 921,430, Jul. 31, 1992, abandoned, which is a continuation of Ser. No. 630,893, Dec. 20, 1990, abandoned.

[30] Foreign Application Priority Data

| Dec. 22, 1989 | [JP] | Japan | 1-332147 |
| Dec. 22, 1989 | [JP] | Japan | 1-333632 |
| Dec. 22, 1989 | [JP] | Japan | 1-333633 |
| Dec. 22, 1989 | [JP] | Japan | 1-333634 |
| Dec. 22, 1989 | [JP] | Japan | 1-333635 |

[51] Int. Cl.⁶ .................................... G06F 15/62
[52] U.S. Cl. .................................... 395/141
[58] Field of Search ............... 395/141, 142; 345/121, 345/133; 382/46, 56; 364/200 MS File, 900 MS File

[56] References Cited

U.S. PATENT DOCUMENTS

| 4,586,038 | 4/1986 | Sims et al. | 340/729 |
| 4,811,245 | 3/1989 | Bunker et al. | 364/521 |
| 4,862,391 | 8/1989 | Ohhashi | 364/522 |
| 4,974,177 | 11/1990 | Nishiguchi | 364/522 |
| 4,975,860 | 12/1990 | Kitaya et al. | 364/520 |
| 5,129,051 | 7/1992 | Cain | 395/133 |
| 5,133,049 | 7/1992 | Cain et al. | 395/133 |

FOREIGN PATENT DOCUMENTS

| 0319787 | 6/1989 | European Pat. Off. | G06F 15/72 |
| 0329101 | 8/1989 | European Pat. Off. | G06F 15/72 |

OTHER PUBLICATIONS

IEEE Computer Graphics and Applications, Mar., 1989, No. 2, "Compositing 3D Images With Antialiasing and Various Shading Effects", Eihachiro Nakamae et al, pp. 21-29.

Primary Examiner—Phu K. Nguyen
Attorney, Agent, or Firm—Hill, Steadman & Simpson

[57] ABSTRACT

A method and apparatus for shading images by approximating a three-dimensional curved surface for computer graphics. Shading of a two-dimensional surface is provided by varying pixel brightness values to indicate a depth dimension of the two-dimensional surface. A plurality of polygons are employed, with each polygon being used to approximate a portion of the curved surface. A coordinate grid is provided extending in horizontal and vertical directions. The polygons are plotted on this coordinate grid. Coordinate grid points of the coordinate grid each represent respective pixels whose brightness is to be varied for the graphics. Scanning occurs across scan lines in a horizontal direction across the grid from grid point to grid point. Vertices of the polygons are provided on the coordinate grid, which vertices may not necessarily lie directly on a grid point. Brightness values at each vertex of the polygon are provided. Using these brightness values, by a process known as sub-pixel addressing, brightness values at the pixels at the grid points of the coordinate grid lying inside of the polygons are determined by linear interpolation based on brightness values at locations where pixels are not provided on sides of the polygon.

7 Claims, 8 Drawing Sheets

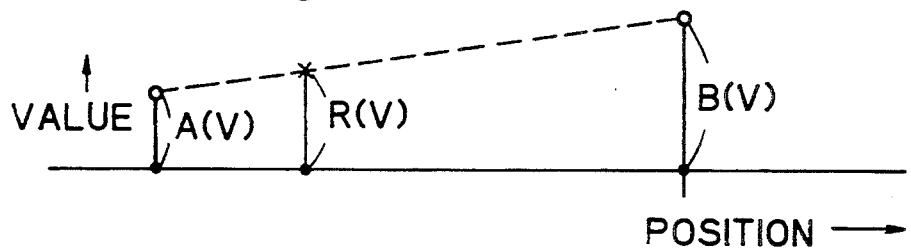
Fig. 1
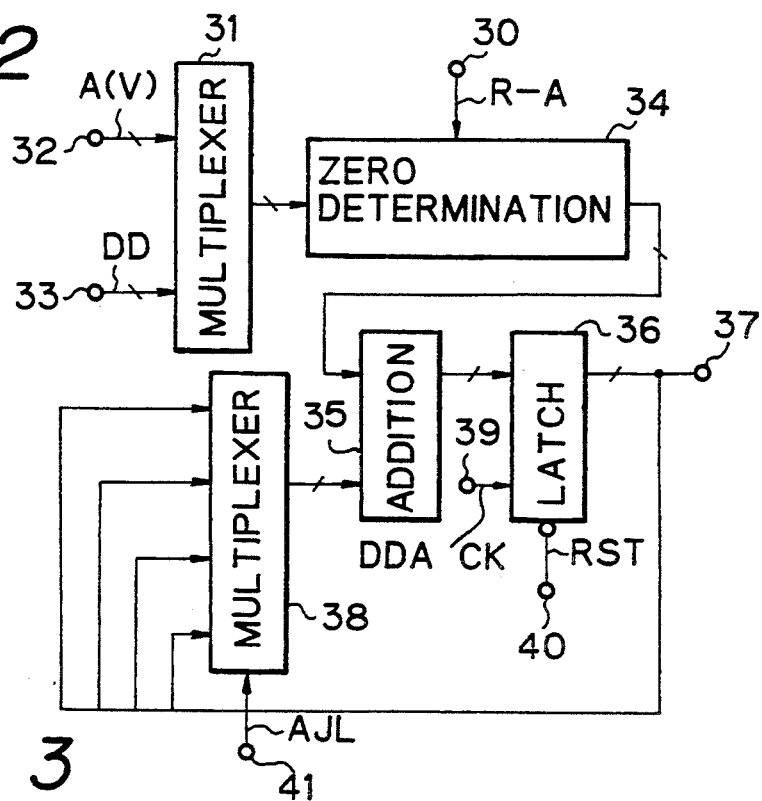
Fig. 2
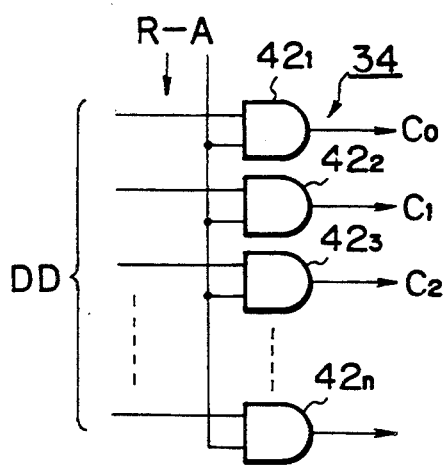
Fig. 3
Fig. 4

SHADING METHOD AND SHADING APPARATUS FOR COMPUTER GRAPHICS

This is a continuation of application Ser. No. 07/921,430, filed Jul. 31, 1992, now abandoned, which is a continuation of application Ser. No. 630,893, filed Dec. 20, 1990, now abandoned.

BACKGROUND OF THE INVENTION

1. Field of the Invention

The present invention relates to a shading method and shading apparatus for computer graphics which is used for shading a three-dimensional object which is displayed on a two-dimensional display.

2. Description of the Prior Art

In computer graphics, when a three-dimensional object is displayed on a two-dimensional display, the surface of the three-dimensional object is shaded so as to improve the reality and visibility of the three-dimensional object. The method for shading the surface of a three-dimensional object is named shading. For example, a shading display method is used where the position of a point light source is determined such that the surface perpendicular to the point light source becomes bright, with the brightness of the surface being proportional to the perpendicularity to the point light source.

The three-dimensional object displayed on the two-dimensional display has a complicated curved surface. To naturally and optimally shade the three-dimensional object with the complicated curved surface according to the shape thereof, a method for approximating the curved surface with a plurality of polygons, inputting values of vertex coordinates of the polygons, and obtaining values inside the polygons with the values given to the vertex coordinates by means of linear interpolation is used. The linear interpolation is conducted by using DDA (digital differential analyzer) computation where the variation of each interval of the coordinate grids is successively added (for example, as disclosed in Japanese Patent Laid-Open Publication No. Sho 61-52737).

To display a three-dimensional object on a two-dimensional display, pixels are provided at the coordinate grid points. Values (depth values and brightness values) according to the pixels are input.

As was described above, in the method for approximating a curved surface with a plurality of polygons, values of vertex coordinates of each polygon are input, and values inside each polygon are obtained by means of the linear interpolation. The coordinates of each vertex may deviate from a coordinate grid point.

However, thus far, values cannot be input to any coordinates other than coordinate grid points. To prevent that, when the coordinates of vertexes of polygons are obtained by approximating a curved surface deviating from the coordinate grid points, the values of the coordinates of vertexes of the polygons are treated as the values on the coordinate grid points nearest to the coordinates.

In this case, values of the coordinates close to the coordinate grid points are input to pixels at the coordinate grid points rather than inputting correct values to pixels at the coordinate grid points. Thus, when the three-dimensional object is moved or deformed or the light source is moved, the image flickers with the accuracy of one pixel.

Thus far, in a method for approximating a curved surface with a plurality of polygons, values of vertex coordinates of the polygon are input, and values inside each polygon are obtained with the input values for each of the vertex coordinates by means of the linear interpolation. The curved surface is approximated by a particular polygon, such as a trapezoid or a triangle.

When a curved surface is approximated with any polygon, a memory with a large amount of capacity is required. In other words, to process any polygon, the memory should store values of vertexes of the polygon at the same time. Thus, to process a polygon where the number of vertexes is unlimited, infinite memory capacity is required.

However, when a curved surface is approximated with a particular polygon such as a trapezoid or a triangle, the drawing efficiency becomes bad. Thus, when a curved surface could be approximated with any polygon, the drawing efficiency would be improved and a complicated curved surface would be optimally shaded on a real time basis.

OBJECT AND SUMMARY OF THE INVENTION

It is, therefore, a first object of the present invention to provide a shading method for computer graphics in which by conducting a compensating computation in the vertical direction against the value of each vertex value, by conducting a compensating computation in the horizontal direction against the values of the end point of the scan line, and by obtaining the value on each coordinate grid point, accurate values at the coordinate grid points can be input and thereby a natural shading which is free from flickering can be obtained on a real time basis.

A second object of the invention is to provide a shading apparatus for computer graphics in which by using an additional loop which can conduct a DDA computation for successively adding variations, a compensating computation for multiplying a value of an initial position by the variations can be conducted, and hardware can be simplified.

A third object of the invention is to provide a shading apparatus for computer graphics in which by providing a parallel process circuit for delaying an input signal by a predetermined time, and by conducting parallel process control of computations in the vertical and horizontal directions, data flow can be easily understood and a parallel process with high maintainability can be performed.

A fourth object of the invention is to provide a shading method for computer graphics which can treat any polygons without increasing memory capacity.

A fifth object of the invention is to provide a shading method for computer graphics in which even if a polygon whose vertical length is less than a predetermined value, the divider is not overflowed and a drawn image is not disordered.

A sixth object of the invention is to provide a shading method for computer graphics which can improve the continuity of a figure.

A seventh object of the invention is to provide a shading apparatus for computer graphics for approximating a curved surface with a plurality of polygons, and for obtaining values inside the plurality of polygons by means of linear interpolation in which by providing the number of bits of the decimal part of a coordinate value in the horizontal direction and in the vertical direction in accordance with the number of bits of the integer part of the attribute, a computation can be conducted in fixed point arithmetic, thus simplifying hardware.

According to an aspect of the present invention wherein there is provided a shading method for computer graphics for approximating a curved surface with a plurality of polygons, inputting values to vertexes of the plurality of polygons, and obtaining values inside the plurality of polygons with the input values for each vertex of the plurality of polygons by means of linear interpolation, the following steps are provided:

conducting a compensating computation in the vertical direction against the value of each vertex value so as to compute the value at the end point of a scan line;

conducting a compensating computation in the horizontal direction against the values of the end point of the scan line so as to compute the value at a start point on a coordinate grid point; and adding a variation to the value of the start point so as to obtain the value at each coordinate grid point.

According to another aspect of the invention, there is provided a shading apparatus for computer graphics for approximating a curved surface with a plurality of polygons, inputting values to vertexes of the plurality of polygons, and obtaining values inside the plurality of polygons with the input values for each vertex of the plurality of polygons by means of linear interpolation, comprising:

an addition loop for supplying an output of an adder to a latch circuit and supplying an output of the latch circuit to the adder, and a DDA computation for successively adding variations and a compensating computation for multiplying a value of an initial position by said variations being conducted by means of the addition loop.

According to still another aspect of the invention, there is provided a shading apparatus for computer graphics for approximating a curved surface with a plurality of polygons, inputting values to vertexes of the plurality of polygons and obtaining values inside the plurality of polygons with the input values for each vertex of the plurality of polygons by means of linear interpolation, whereby in approximating the curved surface with any polygon and in inputting a value of each vertex of said any polygon, the any polygon is treated as a trapezoid;

it is determined whether or not there are vertexes on the left side and the right of the trapezoid;

when there are vertexes on the same line of the left side and the right side of said trapezoid, inputting values of the left side and the right side at the same time; and when there is a vertex on one of the left side and the right side of the trapezoid, a value of the side where there is the vertex is input and the value of the former process is used for the other side.

According to yet another aspect of the present invention, there is provided a shading apparatus for computer graphics for approximating a curved surface with a plurality of polygons, inputting values to vertexes of the plurality of polygons and obtaining values inside the plurality of polygons with the input values for each vertex of the plurality of polygons by means of linear interpolation, wherein the number of bits of the decimal part of an attribute is provided in accordance with the number of bits of the integer part of device coordinates in the horizontal direction or the number of bits of the integer part of device coordinates in the vertical direction, whichever is larger, the number of bits of the decimal part of a coordinate value in the horizontal direction and the decimal part of a coordinate value in the vertical direction being provided in accordance with the number of bits of the integer part of the attribute.

The above, and other, objects, features and advantages of the present invention will become readily apparent from the following detailed description thereof which is to be read in connection with the accompanying drawings.

BRIEF DESCRIPTION OF THE DRAWINGS

FIG. 1 is a schematic diagram describing a compensating computation;

FIG. 2 is a block diagram of a DDA computation circuit with a compensating computation function of the invention;

FIG. 3 is a block diagram describing the DDA computation circuit with the compensating computation function in FIG. 2;

FIG. 4 is a schematic diagram describing a multiplication algorithm by the DDA computation circuit with the compensating computation function;

DETAILED DESCRIPTION OF THE PREFERRED EMBODIMENTS

Figure 5:
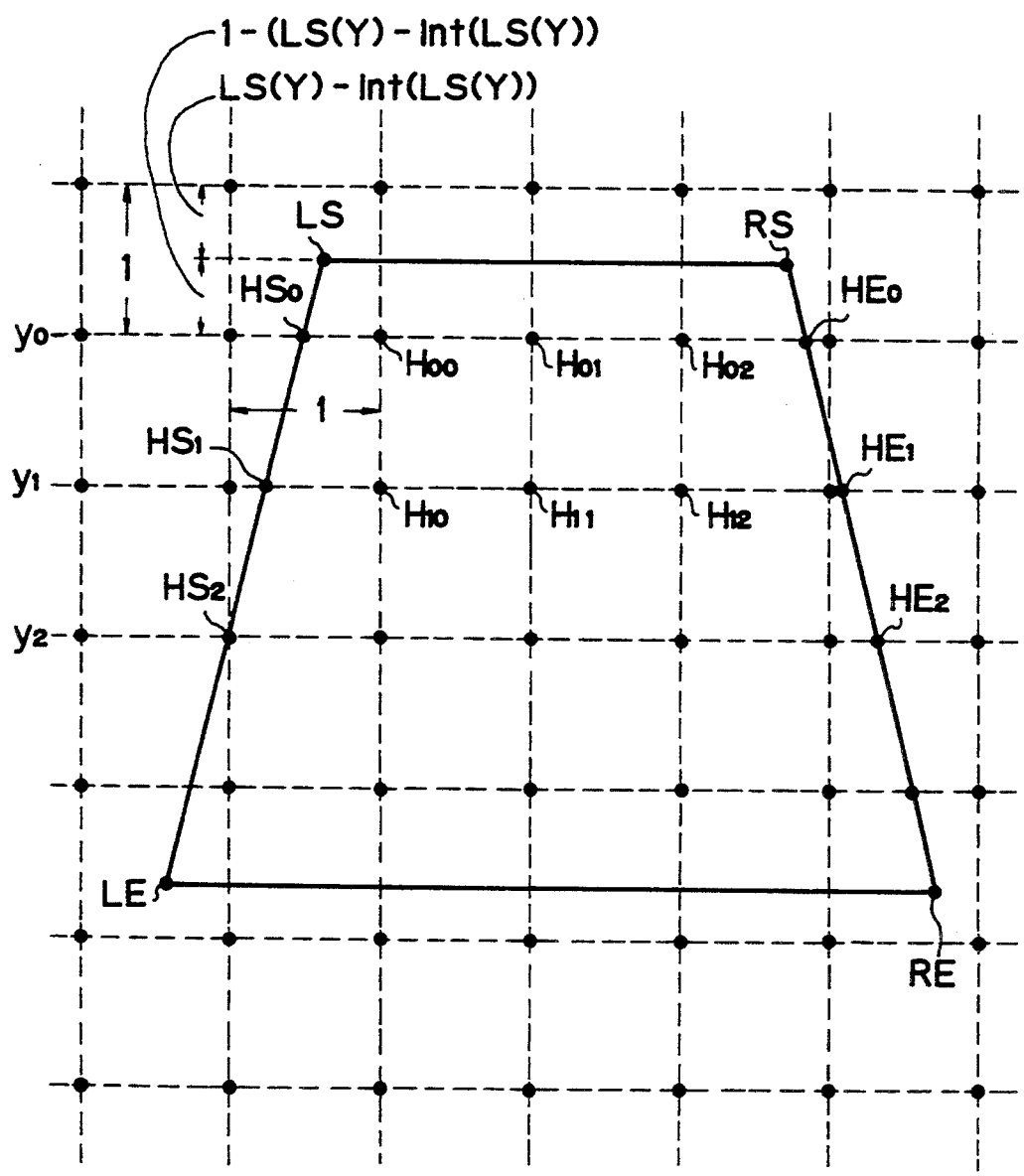
FIG. 5 is a schematic diagram describing a shading.

An embodiment of the present invention will be described in the following order.

a. Outline of shading method
b. Compensating computation
  b1. Theory of compensating computation
  b2. DDA computation circuit with compensating computation function
c. Description of shading method
  c1. Computations necessary for the process
  c2. Drawing procedure
  c3. Extension to any polygon
  c4. Process in the case where large computation error takes place
d. Shading apparatus
  d1. Structure of shading apparatus
  d2. Computation accuracy and number of bits e. Parallel process status transition circuit
  e1. Description of basic circuits
  e2. Parallel process status transition circuit for shading process a. Outline of shading method The present invention relates to a process for approximating a curved surface with a plurality of polygons, inputting brightness values to vertex coordinates of each polygon, and obtaining brightness values inside the brightness polygons with the values for the vertex coordinates by means ,of linear interpolation so as to naturally accomplish shading according to the shape of the curved surface.

In the process for approximating a curved surface with a plurality of polygons, values of vertex coordinates of each polygon are input, and brightness values inside the polygons are obtained by means of linear interpolation. The coordinates of each vertex may deviate from a coordinate grid point.

In an embodiment of the present invention, by inputting the integer part of a horizontal value X and vertical value Y, brightness values can be input between coordinate grid points where there is no pixel. This process is named hereinafter subpixel addressing. Thus, even if the coordinates of vertexes of polygons obtained in the approximation of the curved surface deviate from the coordinate grid points, values according to the vertex coordinates (horizontal value X and vertical value Y) (depth value Z and brightness values R (red), G (green), and B (blue)) can be input.

In the embodiment of the present invention, the subpixel addressing is conducted. After that, a compensating computation is executed. Thus, an accurate pixel value at a coordinate grid point at the start point of the DDA computation of each scan line can be obtained. After that, the DDA computation is repeated so as to obtain the pixel value on each coordinate grid point.

In other words, for the primitive of a trapezoid obtained by approximating the curved surface, vertical compensating computations on the left and right sides are executed. The value of the left end of a scan line (since the scanning operation is executed from the left to the right, the left end of the scan line accords with its start point) and the value of the right end of the scan line (the right end of the scan line accords with its end point) are obtained. With the left end value and the right end value of the scan line, by means of the compensating computation in the horizontal direction, the accurate pixel value at the start point at a coordinate grid point close to the left end of the scan line can be obtained. By repeating the DDA computation in the horizontal direction where variations in the horizontal direction are added to the pixel value at the start point, accurate pixel values on coordinate grid points of each scan line can be obtained. The value at the left end of the next scan line is obtained by means of the DDA computation in the vertical direction where a variation in the vertical direction on the left side is added to the value at the left end of the preceding scan line. Likewise, the value at the right end of the next scan line is obtained by means of DDA computation in the vertical direction where a variation in the vertical direction on the right side is added to the value at the right end of the preceding scan line.

In this case, since the accurate pixel values at the coordinate grid points have been input, high accuracy shading is accomplished in accordance with the motions of a three-dimensional object and a light source on a real time basis, without flickering of the screen.

In approximating a curved surface with a plurality of polygons, when it could be approximated by any polygon, the drawing efficiency would be improved. In this embodiment of the present invention, only when a vertex of the left side and that of the right side are on the same horizontal line, the value of the vertex of the left side and that of the right side are input at the same time. If the value of only one vertex is input, the value of the other vertex is treated as a null value. In this case, the former DDA computation is used. Thus, the computation for a trapezoid can be extended to any polygon.

b. Compensating computation b1. Theory of compensating computation

In the embodiment of the present invention, as was described above, by conducting the compensating computations in the vertical direction on the left side and the right side, the values of the end points of a scan line are obtained. By conducting the compensating computation in the horizontal direction, the accurate pixel value on a coordinate grid point rear the start point is obtained. After that, by repeating the DDA computations in the vertical direction on the left and right sides and in the horizontal direction, the pixel value on each coordinate grid point is obtained.

Then, the compensating computation will be described before discussing the shading process.

As shown in FIG. 1, assuming that values A(V) and B(V) are given to points A and B and these values linearly vary, we obtain value R(V) at point R between the points A and B.

In this case, when these values linearly vary, the value R(V) at the point R between the points A and B can be obtained by means of linear interpolation.

In other words, the value R(V) at the point R between the points A and B can be obtained by the following equation.

$$R(V) = \frac{A(V)(B - R) + B(V)(R - A)}{B - A} \quad (1)$$

In the case of such linear interpolation, multiplication and division should be executed once and twice, respectively. As the number of times of multiplication and division a, large circuit and long computing time are required.

Thus, the above equation is transformed as follows.

$$R(V) = A(V) + (R - A) \times \frac{B(V) - A(V)}{B - A} \quad (2)$$

In the above equation, the term of $$\frac{B(V) - A(V)}{B - A} = DD \quad (3)$$

is a variation DD.

Thus, the value R(V) at the point R between the points A and B can be obtained by the following equation.

$$R(V) = A(V) + (R - A) \times DD \quad (4)$$

In approximating a curved surface with a plurality of polygons and obtaining values in each polygon by means of the linear interpolation so as to conduct a shading, the variation DD for conducting the DDA computation has been obtained in advance. Thus, when the compensating computation is transformed into the above equation, the compensating computation can be accomplished by only one multiplication time. In the compensating computation process, part of a DDA computation circuit can be used. The DDA computation circuit with the compensating computation function will be described in the following.

b2. DDA computation circuit with compensating computation function

In the compensating computation process, as was described above, the product of the distance (R−A) from the initial position A to the compensation position R and the variation DD is added to the value A(V) at the initial position. This process can be accomplished by a DDA computation circuit with the compensating computation function as shown in FIG. 2.

The DDA computation circuit with the compensating computation function can be set in three modes. One mode is a compensation value computing mode for obtaining a compensation value. In the compensation value computing mode, the distance to the compensation position is input from an input terminal 30 and is multiplied by the variation DD being input from an input terminal 33.

Thus, the following computation is conducted:

$$(R-A) \times DD$$

In the multiplication, the distance (R−A) to the compensation position is given as serial data from the least significant bit. Each bit of the distance (R−A) to the compensation position is multiplied by the variation DD and is then shifted to the right. The resultant product is added bit by bit.

In the second mode, the compensation value is added to the value at the initial position so as to obtain the compensated value. Thus, the following computation is conducted and then the value R(V) at the point R is obtained.

$$A(V) + (R-A) \times DD$$

In the third mode, the DDA computation is conducted. In the DDA computation, the process for adding the variation DD to the former value is repeated.

In FIG. 2, the value A(V) at the initial position is input from an input terminal 32 to one of the input terminals of a multiplexer 31. The variation DD is input from the input terminal 33 and is supplied to the other terminal of the multiplexer 31. The value A(V) at the initial position from the input terminal 32 and the variation DD from the input terminal 33 are input as parallel data. An output of the multiplexer 31 is supplied to a zero determination circuit 34. The distance (R−A) to the compensation position is supplied from the input terminal 30 as serial data starting with the least significant bit.

The zero determination circuit 34 is used to multiply the distance (R−A) to the compensation position by the variation DD in the compensation value computing mode.

As shown in FIG. 2, the zero determination circuit 34 is composed of AND gates $41_1$, $42_2$, $42_3$, ..., and $42_n$. Each output data bit of the multiplexer 31 is supplied to one of the input terminals of each of the AND gates $42_1$, $42_2$, $42_3$, ..., and $42_n$. Serial data from the input terminal 30 is supplied to the other input terminal of each of the AND gates $42_1$, $42_2$, $42_3$, ..., and $42_n$.

In FIG. 2, an output of the zero determination circuit 34 is supplied to an adder 35. An output of the adder 35 is supplied to a latch circuit 36.

A DDA clock DDA CK is supplied from a clock input terminal 39 to the latch circuit 36. In addition, a reset signal RST is supplied from a reset terminal 40 to the latch circuit 36. An output of the latch circuit 36 is withdrawn from an output terminal 37. Moreover, the output of the latch circuit 36 is also supplied to a multiplexer 38.

A compensation loop signal AJL is supplied from an input terminal 41 to the multiplexer 38. When the compensation loop signal AJL is supplied from the input terminal 41 to the multiplexer 38, the output of the latch circuit 36 is shifted bit by bit to the right in accordance with each clock, and is then output to the multiplexer 38.

An output of the multiplexer 38 is supplied to the adder 35.

First, the reset signal RST is supplied from the input terminal 40 to the latch circuit 36. This reset signal RST causes the latch circuit 36 to be reset.

Then, the compensation value computing mode takes place, where the compensation value is obtained. In the compensation value computing mode, the multiplexer 31 selects the variation DD from the input terminal 33. The variation DD is supplied from the multiplexer 31 to the zero determination circuit 34 as parallel data. The distance (R−A) to the compensation position is supplied from the input terminal 30 to the zero determination circuit 34 as serial data starting with the least significant bit.

In the zero determination circuit 34, the distance (R−A) to the compensation position is multiplied by the variation DD bit by bit. When one bit of the distance (R−A) to the compensation position is "1", since "1" is multiplied to the variation DD, the variation DD is output through the zero determination circuit 34 as it is. Conversely, when one bit of the distance (R−A) to the compensation position is "0", since "0" is multiplied by the variation DD, "00 ... 0" is output from the zero determination circuit 34.

The output of the adder 35 is supplied to the multiplexer 38 through the latch circuit 36. The compensation loop signal AJL is supplied from the input terminal 41 to the multiplexer 38. Thus, the output of the adder 35 is shifted bit by bit to the right by the multiplexer 38 and is then supplied to the adder 35. The resultant data is accumulated in the latch circuit 36.

By repeating such addition, multiplication of the distance (R−A) to the compensation position by the variation DD is conducted.

In other words, when assuming that the variation DD is 4-bit data "$d_3$, $d_2$, $d_1$, $d_0$" and the distance (R−A) to the compensation position is 4-bit data "$a_3$, $a_2$, $a_1$, $a_0$", the multiplication of the distance (R−A) to the compensation position by the variation DD is conducted as shown in FIG. 4.

First, the least significant bit "$a_0$" of the distance (R−A) to the compensation position is supplied to the zero determination circuit 34. Then, the least significant bit "$a_0$" is multiplied by "$d_3$, $d_2$, $d_1$, $d_0$" and thus "$a_0 d_3$, $a_0 d_2$, $a_0 d_1$, $a_0 d_0$" is obtained.

Then, the low order second bit "$a_1$" of the distance (R−A) to the compensation position is supplied. After that, the low order second bit "$a_1$" is multiplied by "$d_3$, $d_2$, $d_1$, $d_0$" and thus "$a_1d_3$, $a_1d_2$, $a_1d_1$, $a_1d_0$" is obtained.

"$a_1d_3$, $a_1d_2$, $a_1d_1$, $a_1d_0$" is added to "$a_0d_3$, $a_0d_2$, $a_0d_1$, $a_0d_0$" which was shifted by 1 bit to the right.

Likewise, "$a_2d_3$, $a_2d_2$, $a_2d_1$, $a_2d_0$" and "$a_3d_3$, $a_3d_2$, $a_3d_1$, $a_3d_0$" are obtained, shifted by 1 bit to the right and then added.

Thus, multiplication of "$d_3$, $d_2$, $d_1$, $d_0$" by "$a_3$, $a_2$, $a_1$, $a_0$" is conducted and then product "$c_7$, $c_6$, $c_5$, $c_4$, $c_3$, $c_2$, $c_1$, $c_0$" is obtained.

In FIG. 2, the compensation value ($(R-A)$ DD) obtained in the aforementioned manner is stored in the latch circuit 36. After the compensation value ($(R-A)$ DD) is stored in the latch circuit 36, a mode for adding the compensation value ($(R-A)$ DD) to the value A(V) at the initial position and for obtaining a compensated value takes place.

In this mode, the value A(V) at the initial position from the input terminal 32 is output from the multiplexer 31. The value A(V) is supplied to the adder 35 through the zero determination circuit 34.

In the latch circuit 36, the compensation value ($(R-A)$ DD) obtained in the compensation value computing mode is stored. The compensation value ($(R-A)$ DD) is supplied to the adder 35 through the multiplexer 38. In the adder 35, the compensation value ($(R-A)$ DD) is added to the value A(V) at the initial position and then the resultant value is stored in the latch circuit 36.

When the value $(A(V)+(R-A)$ DD) where the compensation value ($(R-A)$,DD) was added to the value A(V) is stored in the latch circuit 36, the DDA mode takes place.

In the DDA mode, the variation DD from the input terminal 33 is output from the multiplexer 31. The variation DD is supplied to the adder 35 through the zero determination circuit 34.

In the adder 35, the former value stored in the latch circuit 36 is added to the variation DD and then the resultant value is stored in the latch circuit 36. The computation for adding the variation DD is repeated.

c. Description of shading method

The the shading method according to the present invention will be described in the following.

Now, assume that a trapezoid as shown in FIG. 5 is obtained as one primitive in approximating a curved surface with a plurality of polygons. In FIG. 5, intersections of vertical dot lines and horizontal dot lines are coordinate grids. On the coordinate grid points, there are pixels. The distance between two vertical or horizontal coordinate grids is 1. By inputting values of vertexes LS, LE, RS, and RE of the trapezoid (horizontal value X, vertical value Y, depth value Z, brightness value R (red value), G (green value), and B (blue value)), the pixel values at the coordinate grid points of the trapezoid are obtained by means of the linear interpolation.

c1. Computations necessary for the process

In the aforementioned shading process, the following computations are conducted.

Computation of variation in the vertical direction on the left side (equation (11))

Computation of variation in the vertical direction on the right side (equation (12))

Compensating computation in the vertical direction on the left side (equation (13))

Compensating computation in the vertical direction on the right side (equation (14))

DDA computation in the vertical direction on the left side (equation (55))

DDA computation in the vertical direction on the right side (equation (16))

Computation of variation in the horizontal direction (equation (17))

Compensating computation in the horizontal direction (equation (18))

DDA computation in the horizontal direction (equation (19))

Computation of variation in the vertical direction on the left side

First, the computation in the vertical direction will be described. A variation DL(X, Z, R, G, B) of each value between two coordinate grid points in the vertical direction on the left side is given by the following equation.

$$DL(X, Z, R, G, B) = \frac{LE(X, Z, R, G, B) - LS(X, Z, R, G, B)}{LE(Y) - LS(Y)} \quad (11)$$

where
- LS(X, Y): Horizontal value X and vertical value Y at upper left vertex LS,
- LS(Z): Depth value Z at upper left vertex LS,
- LS(R, G, B): Brightness values R, G, and B at upper left vertex LS,
- LE(X, Y): Horizontal value X and vertical value Y at lower left vertex LE,
- LE(Z): Depth value Z at lower left vertex LE, and
- LE(R, G, B): Brightness values R, G, and B at lower left vertex LE.

Computation of variation in the vertical direction on the right side

Likewise, a variation DR(X, Z, R, G, B) between two coordinate grids in the vertical direction on the right side is obtained by the following equation, $$DR(X, Z, R, G, B) = \frac{RE(X, Z, R, G, B) - RS(X, Z, R, G, B)}{RE(Y) - RS(Y)} \quad (12)$$

where
- RS(X, Y): Horizontal value X and vertical value Y at upper right vertex RS,
- RS(Z): Depth value Z at upper right vertex RS,
- RS(R, G, B): Brightness values R, G, and B at upper right vertex RS,
- RE(X, Y): Horizontal value X and vertical value Y at lower right vertex RS,
- RE(Z): Depth value Z at lower right vertex RE, and
- RE(R, G, B): Brightness values R, G, and B at lower right vertex RE.

DDA computation in the vertical direction on the left side

When the subpixel addressing is conducted, since the distance between two vertical pixels or two horizontal pixels is 1, the distance from the upper left vertex LS to the nearest scan line $y_0$ is obtained as follows.

$$1 - (LS(Y) - Int(LS(Y)))$$

where Int is a computation for setting the decimal part to 0. (In other words, (LS(Y)−Int(LS(Y))) allows the decimal part of the vertical value Y of the vertex LS to be obtained.)

Thus, the value $HS_0(X, Z, R, G, B)$ at the left end of the scan line $y_0$ is obtained by the following equation.

$$HS_0(X, Z, R, G, B) = LS(X, Z, R, G, B) + (1-(LS(Y)-Int(LS(Y)))) \times DL(X, Z, R, G, B) \quad (13)$$

This equation is used to conduct the compensating computation in the vertical direction on the left side. The compensating computation is obtained in the same manner as the aforementioned equation (2).

Compensating computation in vertical direction on right side

Likewise, the value $HE_0(X, Z, R, G, B)$ at the right end of the scan line $y_0$ is obtained by the following equation.

$$HE_0(X, Z, R, G, B) = RS(X, Z, R, G, B) + (1-(RS(Y)-Int(RS(Y)))) \times DR(X, Z, R, G, B) \quad (14)$$

This equation is used to conduct the compensating computation in the vertical direction on the right side.

DDA computation in the vertical direction on the left side

The value $HS_{j+1}(X, Z, R, G, B)$ at the left end of the next scan line $y_{j+1}$ is obtained by means of the DDA computation in the vertical direction on the left side where the value $HS_j(X, Z, R, G, B)$ at the left end of the previous scan line $y_j$ is added to the variation $DL(X, Z, R, G, B)$ in the vertical direction on the left side. In other words, the value $HS_{j+1}(X, Z, R, G, B)$ at the left end of the next scan line $y_{j+1}$ is obtained by the following equation.

$$HS_{j+1}(X, Z, R, G, B) = HS_j(X, Z, R, G, B) + DL(X, Z, R, G, B) \quad (15)$$

DDA computation in the vertical direction on the right side

Likewise, the value $HE_{j+1}$ at the right end of the next scan line $y_{j+1}$ is obtained by means of the DDA computation in the vertical direction on the right side. In other words, the value $HE_{j+1}(X, Z, R, G, B)$ at the right end of the scan line $y_{j+1}$ is obtained by the following equation.

$$HE_{j+1}(X, Z, R, G, B) = HE_j(X, Z, R, G, B) + DR(X, Z, R, G, B) \quad (16)$$

Computation of variation in the horizontal direction

Then, the computation in the horizontal direction will be described. The variation $DH_j(Z, R, G, B)$ of each value between two coordinate grids in the horizontal direction of the scan line $y_j$ is obtained by the following equation along with the value $HS_j(X, Z, R, G, B)$ at the left end of the scan line $y_j$ (obtained by the equations (3) and (5)) and the value $HE_j(X, Z, R, G, B)$ at the right end of the scan line $y_j$ (obtained by the equations (14) and (16)).

$$DH_j(Z, R, G, B) = \frac{HE_j(Z, R, G, B) - HS_j(Z, R, G, B)}{HE_j(X) - HS_j(X)} \quad (17)$$

Compensating computation in the horizontal direction

The pixel value $H_{j0}(Z, R, G, B)$ on a coordinate grid point close to the left end of the scan line $y_j$ is obtained by the following equation along with the value $HS_j(Z, R, G, B)$ at the left end of the scan line $y_j$ and the variation $DH_j(Z, R, G, B)$ in the horizontal direction.

$$H_{j0}(Z, R, G, B) = HS_j(Z, R, G, B) + (1-(HS_j(X)-Int(HS_j(X))) \times DH_j(Z, R, G, B) \quad (18)$$

This equation is used to conduct the compensating computation in the horizontal direction. The term $H_{j0}(Z, R, G, B)$ is the value at the start point of the scan line $y_j$.

DDA computation in the horizontal direction

Values at the coordinate grid points following the start point of the scan line $y_j$ can be successively obtained by repeating the DDA computation in the horizontal direction. In other words, the value $H_{ji+1}(Z, R, G, B)$ at the coordinate grid points of the scan line $y_j$ can be obtained by the following equation:

$$H_{ji+1}(Z, R, G, B) = H_{ji}(Z, R, G, B) + DH_j(Z, R, G, B) \quad (19)$$

C2. Drawing procedure

Figure 6:
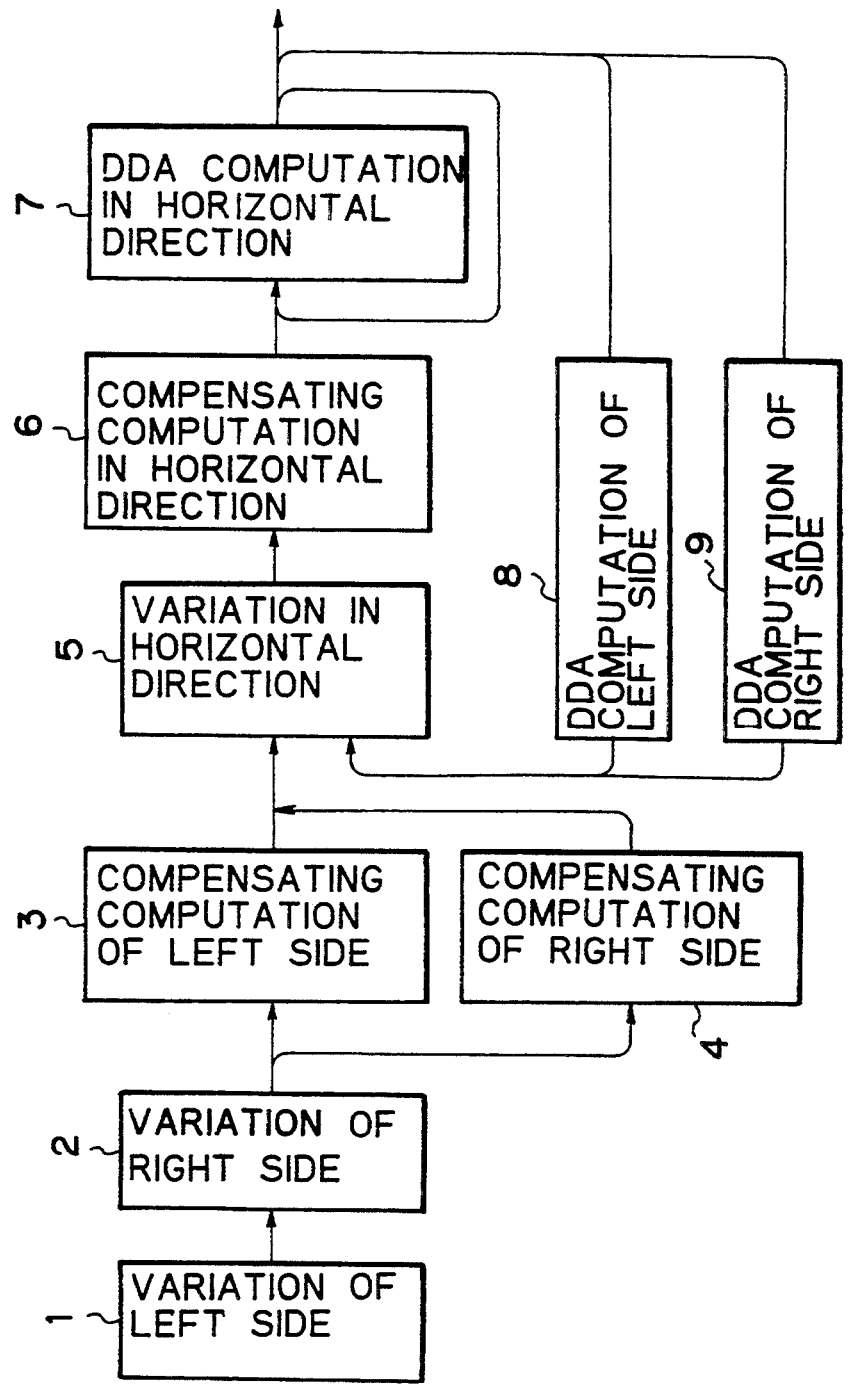
FIG. 6 is a flow chart describing the embodiment of the present invention.

By referring to FIG. 6, a drawing procedure of the shading method according to the present invention will be described in the following.

First, according to the equation (11), the variation $DL(X, Z, R, G, B)$ in the vertical direction on the left side, where the vertex LS and the vertex LE are connected, is obtained (in step 1). On the other hand, according to the equation (12), the variation $DR(X, Z, R, G, B)$ in the vertical direction on the right side, where the vertex RS and the vertex RE are connected, is obtained (in step 2).

Then, according to the equation (13), the compensating computation in the vertical direction on the left side is conducted and thereby the value $HS_0(X, Z, R, G, B)$ at the left end of the first scan line $y_0$ is obtained (in step 3). On the other hand, according to the equation (14), the compensating computation in the vertical direction on the right side is conducted and thereby the value $HE_0(X, Z, R, G, B)$ at the right end of the first scan line $y_0$ is obtained (in step 4). The steps 3 and 4 can be conducted in parallel.

After the value $HS_0(X, Z, R, G, B)$ at the left end of the first scan line $y_0$ and the value $HE_0(X, Z, R, G, B)$ at the right end thereof are obtained in the steps 3 and 4, the variation $DH_0(Z, R, G, B)$ in the horizontal direction of the first scan line $y_0$ is obtained in accordance with the equation (17) (in step 5).

According to the equation (18), the compensating computation in the horizontal direction of the first scan line $y_0$ is conducted and thus the value $H_{00}(Z, R, G, B)$ of a coordinate grid point close to the left end of the first scan line $y_0$ is obtained (in step 6).

After the value $H_{00}(Z, R, G, B)$ at the start point of the scan line $y_0$ is obtained, the DDA computation, where the variation $DH_0(Z, R, G, B)$ in the horizontal direction of the scan line $y_0$ is added, is repeated (in step 7). Thus, the values $H_{01}(X, Z, R, G, B)$, $H_{02}(X, Z, R, G, B)$, . . . and so on of the coordinate grid points following the start point are successively obtained.

After all the values $H_{00}(X, Z, R, G, B)$, $H_{01}(X, Z, R, G, B)$, $H_{02}(X, Z, R, G, B)$ . . . and so on at the coordinate grid points of the scan line $y_0$ are obtained, by means of the DDA computation in the vertical direction on the left side in accordance with the equation (15), the value $HS_1(X, Z, R, G, B)$ at the left end of the next scan line $y_1$ is obtained (in step 8). On the other hand, by means of the DDA computation in the vertical direction on the right side according to the equation (16), the value $HE_1(X, Z, R, G, B)$ at the right end of the next scan line $y_1$ is obtained (in step 9).

After the value $HS_1(X, Z, R, G, B)$ at the left end of the scan line $y_1$ and the value $HE_1(X, Z, R, G, B)$ at the right end thereof are obtained, the flow is returned back to the step 5. In the step 5, the variation $DH_1(X, Z, R, G, B)$ in the horizontal direction of the first scan line $y_1$ is obtained (in the step 5).

In the step 6, according to the equation (18), the compensating computation of the next scan line $y_1$ is conducted and thus the value $H_{10}(X, Z, R, G, B)$ at the start point at the coordinate grid of the first scan line $y_1$ is obtained. In the step 7, by repeating the DDA computation in the horizontal direction according to the equation (19), the values $H_{10}(X, Z, R, G, B)$, $H_{11}(X, Z, R, G, B)$, ... and so on at the coordinate grids of the scan line $y_1$ are successively obtained.

After all the values $H_{10}(X, Z, R, G, B)$, $H_{11}(X, Z, R, G, B)$, $H_{12}(X, Z, R, G, B)$, ... and so on at the coordinate grids of the scan line $y_1$ are obtained, by means of the DDA computation in the vertical direction on the left side according to the equation (15), the value $HS_2(X, Z, R, G, B)$ at the left end of the next scan line $y_2$ is obtained (in the step 8). On the other hand, by means of the DDA computation in the vertical direction on the right side according to the equation (16), the value $HE_2(X, Z, R, G, B)$ at the right end of the next scan line $y_2$ is obtained (in the step 9). Then, the flow is returned back to the step 5 and the same process is repeated.

C3. Extension to any polygon

In this embodiment of the present invention, only when the vertex of the left side and that of the right side are on the same horizontal line, the vertex values on the left side and the right side are input at the same time. If the value of one vertex is input, the value of the other vertex is treated as null. In this case, the former DDA computation is continuously used. Thus, the computation for a trapezoid can be extended to any polygon.

Figure 7:
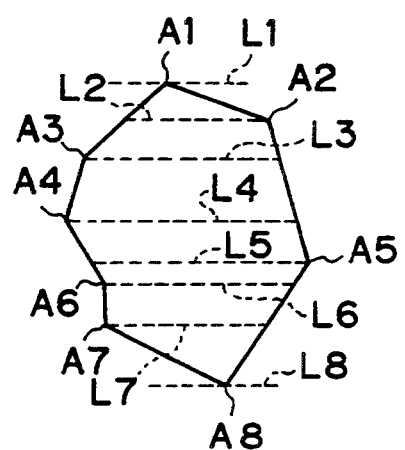
FIGS. 7 and 8 are schematic diagrams describing a process of any polygon in the embodiment of the present invention.

For example, assume that a convex polygon as shown in FIG. 7 is given. The figure being given is treated as a trapezoid. While considering the sides of the trapezoid and designating the upper left vertex, the lower left vertex, the upper right vertex, and the lower right vertex LS, LE, RS, and RE, respectively, values are input to the vertexes.

On the line L1, the value of vertex A1 is input to the upper left vertex LS; the value of vertex A3 is input to the lower left vertex LE; the value of vertex A1 is input to the upper right vertex RS; and the value of vertex A2 is input to the lower right vertex RE.

On the line L2, the vertex A2 on the right side is found. On the line L2, the value of the vertex A2 is input to the upper right vertex RS; and the value of the vertex A5 is input to the lower right vertex RE. On the same horizontal line as the vertex A2, no vertex is present on the left side. Thus, the left side is treated as null.

On the line L3, the vertex A3 is found. On the line L3, the value of the vertex A3 is input to the upper left vertex LS; and the value of the vertex A4 is input to the lower left vertex LE. On the same horizontal line as the vertex A3, since no vertex is present on the right side, the right side is treated as null.

On the line L4, the vertex A4 on the left side is found. On the line L4, the value of the vertex A4 is input to the upper left vertex LS; and the value of the vertex A6 is input to the lower left vertex LE. On the same horizontal line as the vertex A4, since no vertex is present on the right side, the right side is treated as null.

On the line L5, the vertex A5 on the right side is found. On the line L5, the value of the vertex A5 is input to the upper right vertex RS; and the value of the vertex A8 is input to the lower right vertex RE. On the same horizontal line as the vertex A5, since no vertex is present on the left side, the left side is treated as null.

On the line L6, the vertex A6 on the left side is found. On the line L6, the value of the vertex A6 is input to the upper left vertex LS; and the value of the vertex A7 is input to the lower left vertex LE. On the same horizontal line as the vertex A6, no vertex is present on the right side, the right side being treated as null.

On the line L7, the vertex A7 on the left side is found. On the line L7, the value of the vertex A7 is input to the upper left vertex LS; and the value of the vertex A8 is input to the lower left vertex LE. On the same horizontal line as the vertex A7, since no vertex is present on the right side, the right side is treated as null.

Thus, only when a vertex on the left side and a vertex on the right side are present on the same horizontal line, the vertex values on the left side and the right side are input at the same time. If the value of one vertex is input, the value of the other vertex is treated as null and then the former DDA computation is continuously used. Consequently, the computation for a trapezoid can be extended to any polygon without an increase of the memory capacity.

In other words, on the lines between the lines L1 and L2, by using the values of the vertexes A1 and A3, the variation in the vertical direction on the left side is obtained and the compensating computation in the vertical direction on the left side is conducted. In addition, by using the values of the vertexes A1 and A2, the variation in the vertical direction on the right side is obtained and the compensating computation in the vertical direction on the right side is conducted. Then, the values at the left end and the right end of each scan line are obtained. By using the resultant values, the variation in the horizontal direction is obtained. Then, the compensating computation in the horizontal direction is conducted and the value at the start point is obtained. By means of the DDA computation in the horizontal direction, the pixel values at the coordinate grid points on the scan lines between the lines L1 and L2 are obtained.

On the lines between the lines L2 and L3, on the left side, the former variation in the vertical direction on the left side is continuously used. By means of the DDA computation in the vertical direction on the left side, the value at the left end on the scan line is obtained. On the right side, by using the values of the vertexes A2 and A5, the variation on the right side is obtained and the compensating computation on the right side is conducted. Then, the value at the right end on the scan line is obtained. Thereby, the variation in the horizontal direction is obtained. After that, the compensating computation in the horizontal direction is conducted and the value at the start point is obtained. By means of the DDA computation in the horizontal direction, the pixel values on the coordinate grid points on the scan lines between the lines L2 and L3 are obtained.

Likewise, on the lines between the lines L3 and L4, on the left side, by using the values of the vertexes A3 and A4, the variation in the vertical direction on the left side is obtained. On the right side, the former variation is continuously used.

On the lines between the lines L4 and L5, on the left side, by using the values of the vertexes A4 and A6, the variation in the vertical direction on the left side is obtained. On the right side, the former variation is continuously used.

On the lines between the lines L5 and L6, on the left side, the former variation is continuously used. On the right side, by using the values of the vertexes A5 and A8, the variation in the vertical direction on the right side is obtained.

On the lines between the lines L6 and L7, on the left side, by using the values of the vertexes A6 and A7, the variation in the vertical direction on the left side is obtained. On the right side, the former variation is continuously used.

On the lines between the lines L7 and L8, on the left side, by using the values of the vertexes A7 and A8, the variation in the vertical direction on the left side is obtained. On the right side, the former variation is continuously used.

Figure 8:
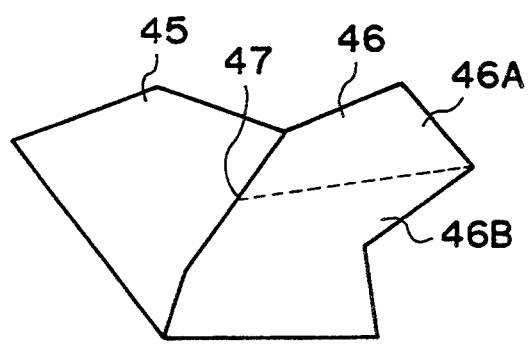

By processing any polygon in the aforementioned manner, the compensating computation is conducted only for the vertexes rather than the line sections. Thus, continuity of the figure is improved. In other words, when a curved surface is approximated by a polygon, FIG. 45 and FIG. 46 take place as shown in FIG. 8. To process the figures by using predetermined polygons, it is necessary to divide the FIG. 46 into FIG. 46A and FIG. 46B. At that time, a computation error may occur at a connected portion 47 among the FIG. 46A, the FIG. 46B, and the FIG. 45.

As described above, when any polygon is processed, no gap takes place between the line sections and the connected portion of each figure. This is because any non-vertex portion is treated as null and the former DDA computation is continuously used.

c4. Process in the case where large computation error takes place

In the case where the length in the vertical direction of a trapezoid obtained by approximating a curved surface is less than 1, when the variation in the vertical direction is obtained, a division is conducted by using a divisor of a value close to 0. Thus, there is a high possibility where the divider gets overflowed. When a figure is displayed by using overflowed values, it is disordered.

To prevent that, it is possible to ignore a figure where the length in the vertical direction is close to 0.

However, when a figure where the length in the vertical direction is close to 0 is ignored, it is necessary to consider a problem with respect to the continuity of the figure.

In the embodiment of the present invention, when a trapezoid whose length in the vertical direction is smaller than 1 is processed, a side whose length is long, resulting in an overflow of the divider, is replaced with a vertical side whose start point is the same as the former. Thus, it is possible to prevent the divider from getting overflowed. In addition, the continuity of the figure is improved.

Figure 9:
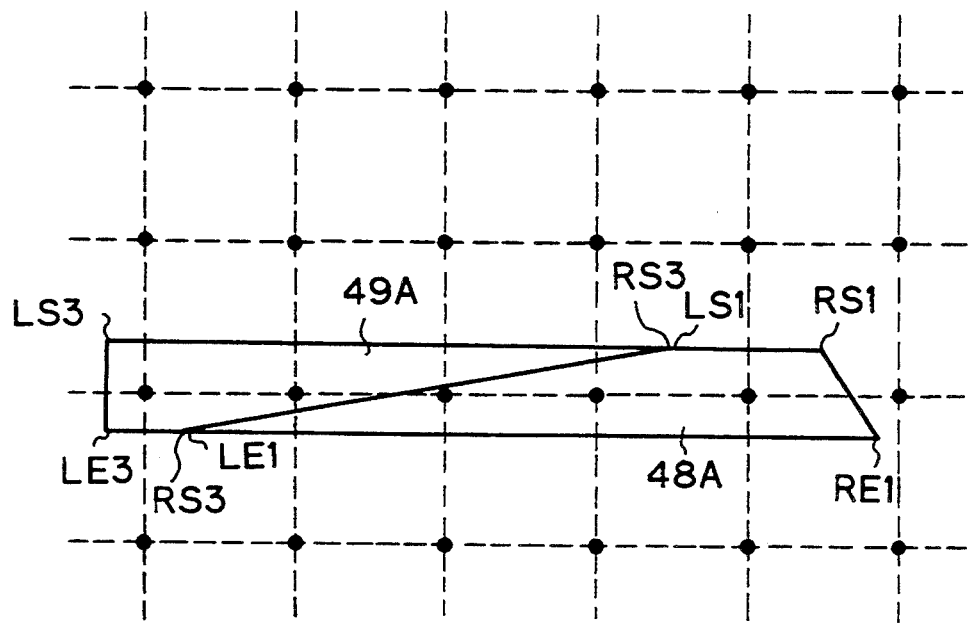
FIGS. 9 and 10 are schematic diagrams describing a process against a large computation error in the embodiment of the present invention.

In other words, as shown in FIG. 9, assume that a trapezoid whose length in the vertical direction is 1 or less takes place. Since this figure is at coordinate grid points, when this figure is not displayed, the problem with respect to the continuity of the figure will take place. For this figure, when obtaining the variation on the left side where the upper left vertex LS1 is connected to the lower left vertex LE1, since the left side is nearly horizontal and the length of the left side is very long in comparison with the length in the vertical direction, there is a possibility where the divider gets overflowed.

Figure 10:
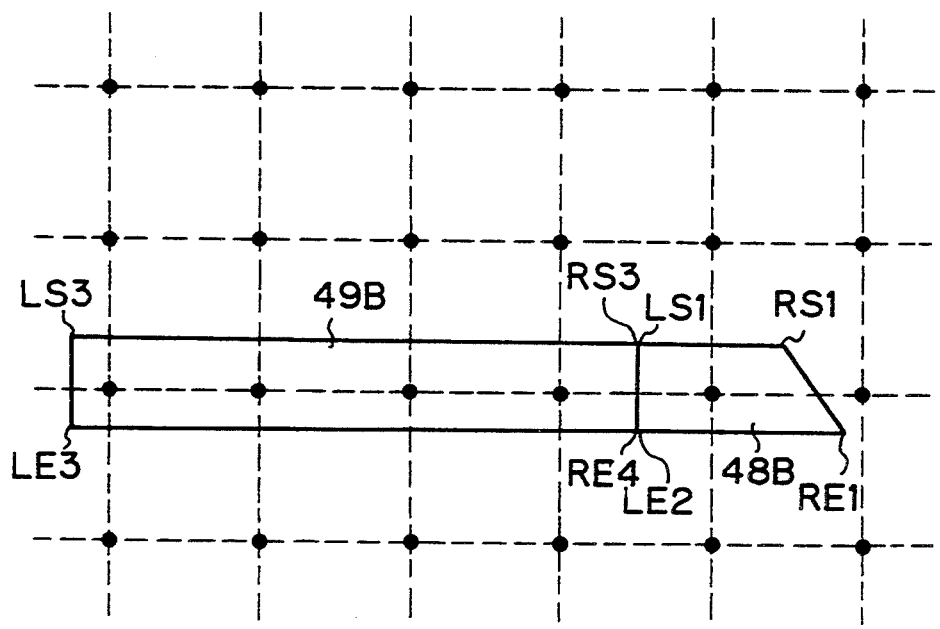

To prevent that, as shown in FIG. 10, the left side line (LS1 to LE1) is replaced with a vertical line (LS1 to LE2) which starts with the start point LS1 which is the same as the former and thereby the figure is processed as a trapezoid 48B. When the nearly horizontal side (LS1 to LE1) is replaced with the vertical side (LS1 to LE2), the length of the side becomes short. Thus, when obtaining the variation on the left side, the divider will not get overflowed.

At that time, as shown in FIG. 10, the right side of the FIG. 49A adjacent to the trapezoid 48A is replaced with the vertical side (RS3 to RE4) which starts with RS3, which is the same as the former, and thus the figure is processed as a trapezoid 49B.

Since the right side (LS1 to LE2) of the trapezoid 48B accords with the right side (RS3 to RE4) of the trapezoid 49B, the problem with respect to the continuity of the figure does not take place.

d. Shading apparatus d1. Structure of shading apparatus

Figure 11:
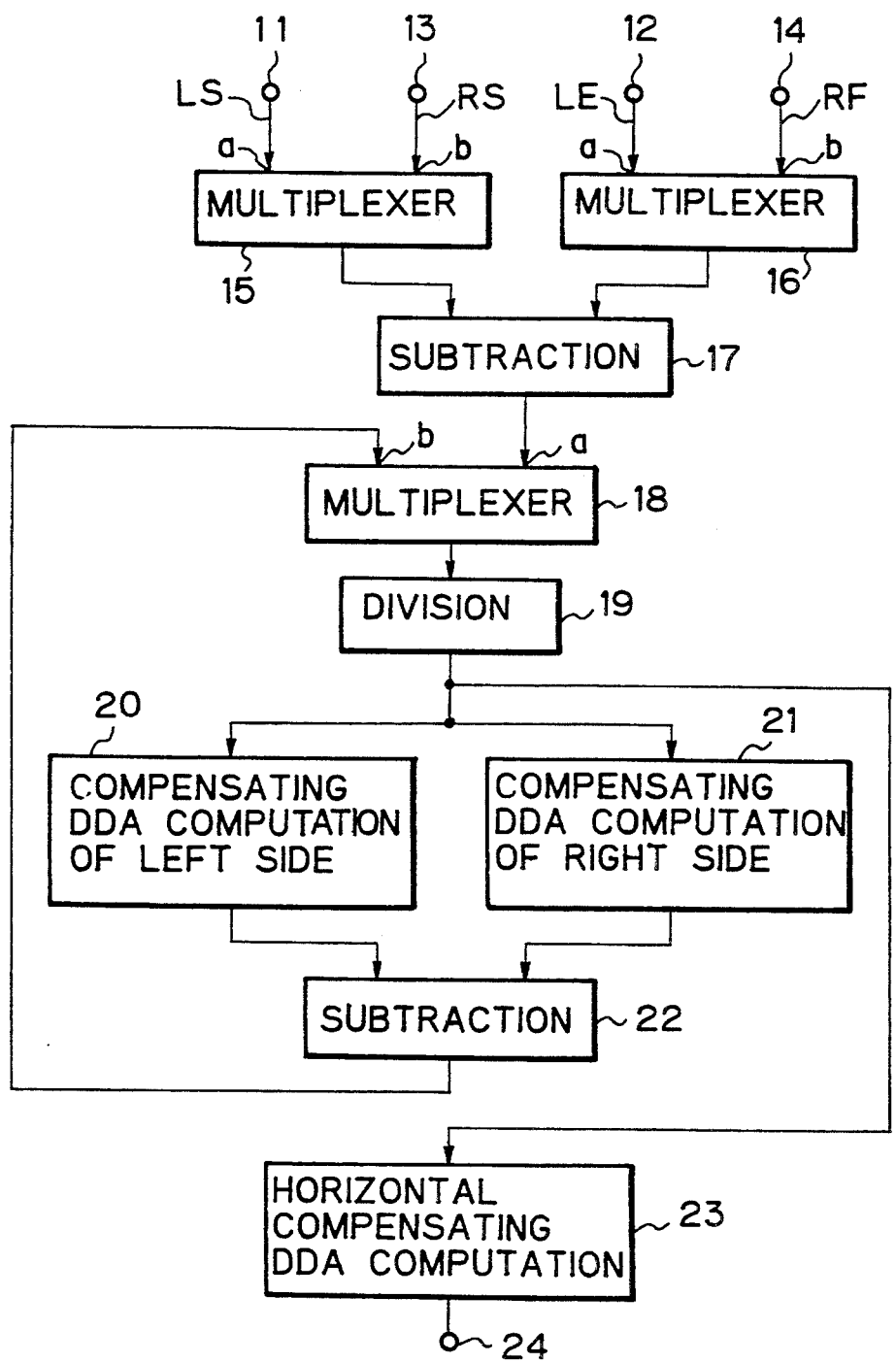
FIG. 11 is a block diagram showing an embodiment of the present invention.

FIG. 11 is a schematic showing the structure of hardware for obtaining the depth value Z and the brightness values R, G, and B of the pixel at each coordinate grid point in the aforementioned manner. In FIG. 11, to simplify the description, each value (Z, R, G, B) is processed by a single hardware unit. Actually, several hardware units for obtaining each value are provided and they are operated in parallel.

In FIG. 11, the upper left vertex value LS(X, Y, Z, R, G, B) is input to an input terminal 11 and the lower left vertex value LE(X, Y, Z, R, G, B) is input to an input terminal 12. The upper right vertex value RS(X, Y, Z, R, G, B) is input to an input terminal 13 and the lower right vertex value RE(X, Y, Z, R, G, B) is input to an input terminal 14.

The value from the input terminal 11 is supplied to an input terminal a of a multiplexer 15. The value from the input terminal 13 is supplied to an input terminal b of the multiplexer 15.

The value from the input terminal 12 is supplied to an input terminal a of a multiplexer 16. The value from the input terminal 14 is supplied to an input terminal b of the multiplexer 16.

In the multiplexer 15 the value from the input terminal 11 or the value from the input terminal 13 is selected. In the multiplexer 16 the value from the input terminal 12 or the value from the input terminal 14 is selected.

Outputs of the multiplexer 15 and the multiplexer 16 are supplied to a subtracter 17.

An output of the subtracter 17 is supplied to an input terminal a of a multiplexer 18. An output of a subtracter 22 is supplied to an input terminal b of the multiplexer 18.

An output of the multiplexer 18 is supplied to a divider 19. An output of the divider 19 is supplied to a DDA computation circuit 20 with the left side compensating computation function and a DDA computation circuit 21 with the right side compensating computation function. In addition, the output of the divider 19 is supplied to a DDA computation circuit 23 with the horizontal compensating computation function.

Outputs of the DDA computation circuit 20 with the left side compensating computation function and the DDA computation circuit 21 with the right side compensating computation function are supplied to the subtracter 22. An output of the subtracter 22 is supplied to the input terminal b of the multiplexer 18.

An output of the DDA computation circuit 23 with the horizontal compensating computation function is output from an output terminal 24.

First, the multiplexer 15 is set to the position a and the upper left vertex value LS(X, Y, Z, R, G, B) from the input terminal 11 is given to the subtracter 17. On the other hand, the multiplexer 16 is set to the position a and the lower left vertex value LE(X, Y, Z, R, G, B) is given to the subtracter 17.

By the subtracter 17, the lower left vertex value is subtracted from the upper left vertex value and the resultant value of the subtraction is supplied to the input terminal a of the multiplexer 18.

The multiplexer 18 is set in the position a and the resultant value of the subtraction is supplied to the divider 19.

By the divider 19, the variation in the vertical direction on the left side is obtained in accordance with the equation (11). The variation in the vertical direction on the left side is set to the DDA computation circuit 20 with the left side compensating computation function.

After the variation in the vertical direction on the left side is set to the DDA computation circuit 20 with the left side compensating computation function, the multiplexer 15 is set to the position b and then the upper right vertex value RS(X, Y, Z, R, G, B) from the input terminal 13 is given to the subtracter 17. In addition, the multiplexer 16 is set to the position b and the lower right vertex value RE(X, Y, Z, R, G, B) from the input terminal 14 is given to the subtracter 17.

By the subtracter 17, the lower right vertex value is subtracted from the upper right vertex value and the resultant value of the subtraction is supplied to the input terminal a of the multiplexer 18.

The multiplexer 18 is set to the position a and the resultant value of the subtraction is supplied to the divider 19.

By the divider 19, the variation in the vertical direction on the right side is obtained in accordance with the equation (12). The variation in the vertical direction on the right side is set to the DDA computation circuit 21 with the right side compensating computation function.

The variation in the vertical direction on the left side is set to the DDA computation circuit 20 with the left side compensating computation function and the variation in the vertical direction on the right side is set to the DDA computation circuit 21 with the right side compensating computation function. After that, in the DDA computation circuit 20 with the left side compensating computation function and the DDA computation circuit 21 with the right side compensating computation function, the compensating computation in the vertical direction on the left side and that in the vertical direction on the right side are conducted, respectively.

Thus, the left end value and right end value of the scan line are obtained.

The left end value and the right end value of the scan line are supplied to the subtracter 22. By the subtracter 22, the right end value of the scan line is subtracted from the left end value of the scan line.

By the DDA computation circuit 20 with the left side compensating computation function and the DDA computation circuit 21 with the right side compensating computation function, the compensating computation in the vertical direction on the left side and that in the vertical direction on the right side are conducted, respectively. After that, the multiplexer 18 is switched to the position b.

Thus, the resultant value of the subtraction obtained by the subtracter 22, where the right end value of the scan line is subtracted from the left end value of the scan line, is supplied to the divider 19 through the multiplexer 18.

By the divider 19, the variation in the horizontal direction is obtained in accordance with the equation (17). The variation in the horizontal direction is supplied to the DDA computation circuit 23 with the horizontal compensating computation function.

By the DDA computation circuit 23 with the horizontal compensating computation function, the compensating computation in the horizontal direction is conducted and the value at the coordinate grid point at the start point of the scan line is obtained. By the DDA computation circuit 23 with the horizontal compensating computation function, the DDA computation for the value at the start point is repeated and the values at the coordinate grid points on the scan line are successively obtained. The values are output from the output terminal 24.

After all the values on the coordinate grid points of one scan line are obtained, by the DDA computation circuit 20 with the left side compensating computation function and the DDA computation circuit 21 with the right side compensating computation function, the DDA computation in the vertical direction on the left side and that in the vertical direction on the right side are conducted and then the right end value and the left end value of the next scan line are obtained.

The left end value and the right end value of the next scan line are supplied to the subtracter 22. By the subtracter 22, the right end value of the next scan line is subtracted from the left end value of the next scan line.

The resultant value of the subtraction obtained by the subtracter 22, where the right end value of the next scan line is subtracted from the left end value of the next scan line, is supplied to the divider 19 through the multiplexer 18.

By the divider 19, the variation in the horizontal direction of the next scan line is obtained. The variation in the horizontal direction is supplied to the DDA computation circuit 23 with the horizontal compensating computation function.

By the DDA computation circuit 23 with the horizontal compensating computation function, the compensating computation in the horizontal direction is conducted and the value at the coordinate grid point at the start point of the next scan line is obtained. By the DDA computation circuit 23 with the horizontal compensating computation function, the DDA computation is repeated for the start point and then the values at the coordinate grid points on the scan line are successively obtained. The resultant values are output from the output terminal 24.

The same operations are repeated.

d2. Computation accuracy and number of bits

Even if the hardware as shown in FIG. 11 is separately provided for each value (depth value Z and brightness values R, G, and B) so as to compute each value in parallel, the circuit scale is not increased. Since the number of bits of the decimal part necessary for computing each value is determined, each value can be computed in fixed decimal point arithmetic.

This operation will be described in the following. First, we consider the relationship between the maximum value of the device coordinates of the horizontal value X and the vertical value Y and the number of bits of the decimal part of the depth value Z.

The depth value Z is obtained by repeating the DDA computation. Thus, the error of the depth value Z is maximized when the DDA computation is repeated from one end to the other end of the screen. The maximum error should be ±1 or less.

Assume that the length of the device coordinates from one end to the other end of the screen is n bits. At that time, to obtain the depth value Z by repeating the DDA computation from one end to the other end of the screen, the DDA computation is repeated $2^n$ times. Thus, when the error of the DDA computation one time is e, the maximum value of the error becomes $2^n \times \epsilon$. To decrease the error of the depth value Z to ±1 or less, the error per one time the DDA computation should be $(\epsilon < \frac{1}{2}^n)$. In other words, the depth value Z should have the accuracy of $(\frac{1}{2}^n)$. The number of bits of the decimal part of the depth value Z should be n bits at least.

Thus, the relationship between the number of bits of the decimal part of the depth value Z, namely ZFB, and the maximum value of the device coordinates of the horizontal value X and the vertical value Y should be as follows.

$$ZFB = \text{Max}(XD, YD)$$

where
XD: Maximum value of device coordinates of horizontal value X (number of bits of integer part), and
YD: Maximum value of device coordinates of vertical value Y (number of bits of integer part).

Then, we consider the relationship between the maximum value of the depth value Z and the number of bits of the decimal part of the horizontal value X and the vertical value Y.

As expressed by the equations (13), (14) and (18), in the compensating computation, multiplication of the decimal parts of the vertical value Y, (LS(Y)−Int(LS(Y))) and (RS(Y)−Int(RS(Y))), the decimal part of the horizontal value Y, ($HS_j(X)$−Int($HS(X)$))), and the variations of the depth value Z, (DL(Z)), (DR(Z), and ($DH_j(Z)$) are conducted. To allow the error to be ±1 or less, it is necessary to provide the number of bits according to the number of significant bits of the variation of the depth value Z for the decimal part of the horizontal value X and that of the vertical value Y.

When the variation of the depth value Z becomes maximum, all the bits of the integer part become significant bits. Thus, the number of bits of the decimal part of the horizontal value X, XFD, and that of the vertical value Y, YFD, should be the number of bits according to the maximum value of the depth value Z.

In other words, the number of bits of the decimal part of X, XFD, and that of Y, YFD, should be as follows.

$$XFD = ZD$$

$$YFD = ZD$$

where ZD: Maximum value of depth value Z.

The number of bits necessary for the depth value Z was described above. The number of bits of the decimal part necessary for computing the brightness values R, G, and B can be obtained likewise. Thus, the number of bits of the decimal part necessary for computing each value is determined. Consequently, it is not necessary to conduct the computation in the floating point arithmetic. Unless the floating point arithmetic is executed, even if hardware units for computing each value are independently provided, the circuit scale will not be increased.

e. Parallel process status transition circuit e1. Description of basic circuits

Figure 12:
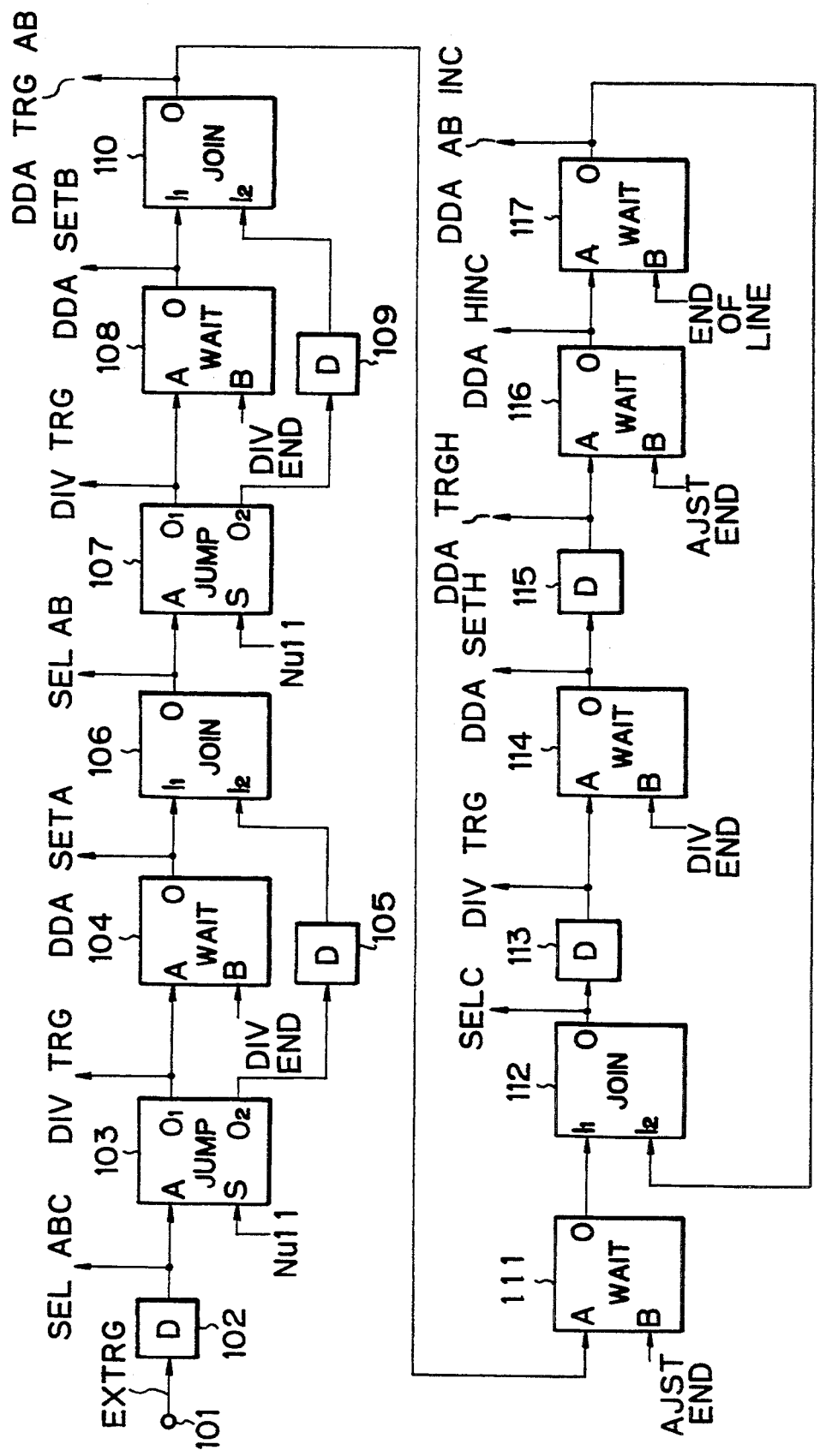
FIG. 12 is a block diagram of the parallel process status transition circuit according to the present invention.

The hardware shown in FIG. 11 is controlled by a parallel process status transition circuit shown in FIG. 12.

The parallel process status transition circuit is composed of four types of circuits which are wait circuits, jump circuits, join circuits, and delay circuits. The basic circuits will be described in the following.

Wait circuit

The wait circuit has two inputs A and B. After the wait circuit receives an A input pulse, it stops a pulse from being output until it receives a B input pulse. When a trigger pulse for starting a particular process is output, the wait circuit stops the flow from advancing to the next process until the former process is completed.

Structure of wait circuit

Figure 13:
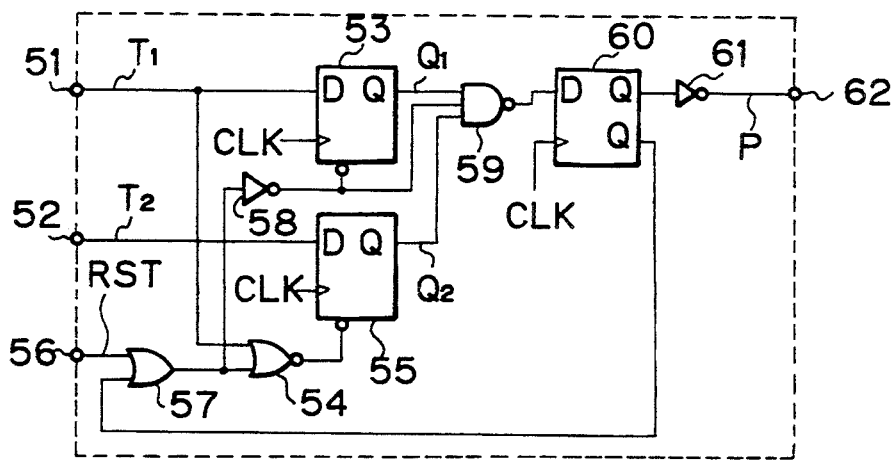
FIG. 13 is a block diagram of a wait circuit.

The wait circuit is structured as shown in FIG. 13. In FIG. 13, numerals 51 and 52 are input terminals. A trigger pulse $T_1$ from the input terminal 51 is supplied to a flip flop 53 and one input terminal of a NOR gate 54. A trigger pulse $T_2$ from the input terminal 52 is supplied to a flip flop 55. A clock CLK is supplied to clock input terminals of the flip flops 53 and 55. After a trigger pulse is given to D input terminals of the flip flops 53 and 55, when the clock CLK goes high, the flip flops 53 and 55 are set and their outputs go high. Until a low level reset signal is given to each reset terminal, the output is kept high.

Numeral 56 is a reset input terminal. A reset signal RST from the reset input terminal 56 is supplied to one input terminal of an OR gate 57. An output of the OR gate 57 is supplied to the other input terminal of the NOR gate 54 and an inverter 58. An output of the NOR gate 54 is supplied to a reset terminal of the flip flop 55. An output of the inverter 58 is supplied to a reset terminal of the flip flop 53 and an input terminal of a NAND gate 59.

An output of the flip flop 53 is supplied to an input terminal of the NAND gate 59. An output of the flip flop 55 is supplied to an input terminal of the NAND gate 59.

An output of the NAND gate 59 is supplied to an input terminal of a D flip flop 60. A clock CLK is supplied to a clock input terminal of the D flip flop 60. An output of the D flip flop 60 is output from an output terminal 62 through an inverter 61. The inverted output of the D flip flop 60 is supplied to the other input terminal of the OR gate 57.

When the reset signal RST which goes high is given to the reset input terminal 56, the output of the OR gate 57 goes high, the output of the inverter 58 goes low, and the output of the NOR gate 54 goes low. Thus, the flip flops 53 and 55 are reset.

When the output of the inverter 58 goes low, the output of the NAND gate 59 goes high and the output of the D flip flop 60 is kept high. Thus, the output where the output of the D flip flop 60 was inverted by the inverter 61 goes low.

Figure 14:
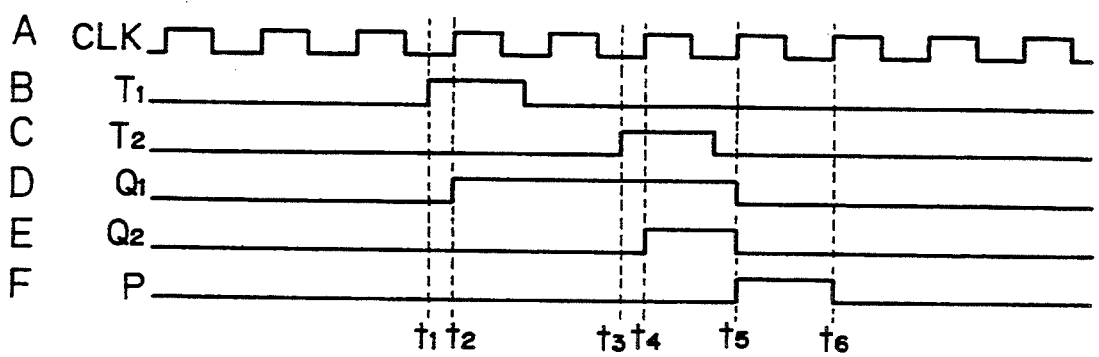
FIG. 14 is a timing chart describing an example of the wait circuit.

As shown in FIG. 14B, now, we assume that at time $t_1$, the trigger pulse $T_1$ is supplied to the input terminal 51. Thus, as shown in FIG. 14D, at time $t_2$, when the clock CLK (FIG. 14A) goes high, the trigger pulse $T_1$ is received by the flip flop 53 and thus the output Q1 of the flip flop 53 goes high.

At time t3, when the trigger pulse $T_1$ is supplied to the input terminal 52, as shown in FIG. 14E, at time $t_4$, when the clock CLK (FIG. 14A) goes high, the trigger pulse $T_2$ is received by the flip flop 55 and thus the output Q2 of the flip flop 55 goes high.

At that time, as shown in FIG. 14D, the output of the flip flop 53 goes high. In addition, when the D flip flop 60 is reset, its input goes high. Thus, the inverted output of the D flip flop 60 goes low, the output of the OR gate 57 goes low, and the output of the inverter 58 goes high. Thus, when the trigger pulse $T_2$ is given and the output Q2 of the flip flop 55 goes high, the output of the NAND gate 59 goes low.

When the output of the NAND gate 59 goes low, at time $t_5$, when the clock CLK goes high, the output of the D flip flop 60 goes low. Thus, as shown in FIG. 14F, the output P of the output terminal 62 goes high.

When the output of the D flip flop 60 goes low, the inverted output of the D flip flop 60 goes high and the output of the OR gate 57 goes high.

When the output of the OR gate 57 goes high, the output of the inverter 58 goes low and the output of the NOR gate 54 goes low. Thus, as shown in FIG. 14D, the flip flops 53 and 55 are reset.

Thus, the outputs of the flip flops 53 and 55 go low and the output of the inverter 58 goes low. Consequently, the output of the NAND gate 59 goes high. When the output of the NAND gate 59 goes high, at time $t_6$, when the clock CLK goes high, the output of the D flip flop 60 goes high. Thus, at time $t_6$, the output pulse P goes low.

As shown in FIG. 14F, in such a wait circuit, after the trigger pulse $T_1$ (FIG. 14B) and the trigger pulse $T_2$ (FIG. 14C) are supplied in order, the pulse P is output from the output terminal 62.

Jump circuit

The jump circuit has two inputs A and S. Depending on the level of the S input, an A input pulse is output selectively to one of two outputs O1 and O2. The jump circuit can be used to change the present control state depending on an external condition.

Structure of jump circuit

Figure 15:
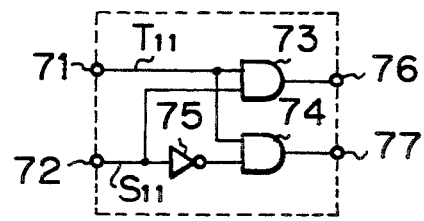
FIG. 15 is a block diagram of a jump circuit.

The jump circuit is structured as shown in FIG. 15. In FIG. 15, a trigger pulse $T_{11}$ is supplied to an input terminal 71. The trigger pulse $T_{11}$ is supplied to one of the input terminals of an AND gate 73 and one of the input terminals of an AND gate 74.

A selection pulse $S_{11}$ is supplied to the input terminal 72. The selection pulse $S_{11}$ is supplied to the other input terminal of the AND gate 73 and the other terminal of the AND gate 74 through an inverter 75. An output of the AND gate 73 is output from an output terminal 76. An output of the AND gate 74 is output from an output terminal 77.

While the selection pulse $S_{11}$ from the input terminal 72 goes high, when the trigger pulse $T_{11}$ is supplied from the input terminal 71, the trigger pulse $T_{11}$ is output from the output terminal 76 through the AND gate 73.

While the selection pulse $S_{11}$ from the input terminal goes low when the trigger pulse $T_{11}$ is supplied from the input terminal 71, the trigger pulse $T_{11}$ is output from the output terminal 77 through the AND gate 74.

Join circuit

The join circuit has two inputs I1 and I2. When a pulse is input to I1 or I2, the join circuit outputs the pulse. The join circuit can be used to collect signals from several control systems to one control system.

Structure of join circuit

Figure 16:
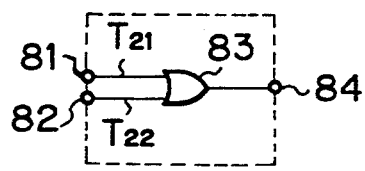
FIG. 16 is a block diagram of a join circuit.

The join circuit is structured as shown in FIG. 16. In FIG. 16, a trigger pulse $T_{21}$ is supplied to an input terminal 81. The trigger pulse $T_{21}$ from the input terminal 81 is supplied to one of input terminals of an OR gate 83. A trigger pulse $T_{22}$ is supplied to an input terminal 82. The trigger pulse $T_{22}$ from the input terminal 82 is supplied to the other input terminal of the OR gate 83. An output of the OR gate 83 is output from an output terminal 84.

When the trigger pulse $T_{21}$ is supplied to the input terminal 81, the trigger pulse $T_{21}$ is output from the output terminal 84 through the OR gate 83.

When the trigger pulse $T_{22}$ is supplied to the input terminal 82, the trigger pulse $T_{22}$ is output from the output terminal 84 through the OR gate 83.

Delay circuit

The delay circuit delays an input for a predetermined time period. The delay circuit can be used to cause a process to be completed with a delay of a predetermined time period.

Structure of delay circuit

Figure 17:
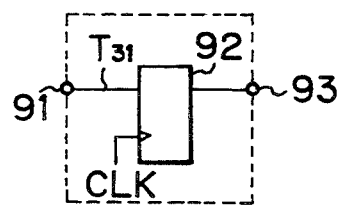
FIG. 17 is a block diagram of a delay circuit.

The delay circuit is structured as shown in FIG. 17. In FIG. 17, a trigger pulse $T_{31}$ is supplied to an input terminal 91. The trigger pulse $T_{31}$ from the input terminal 91 is supplied toga flip flop 95. An output of the flip flop 92 is output from the output terminal 93.

The trigger pulse $T_{31}$ from the input terminal 91 is delayed through the flip flop 92 and then output from the output terminal 93.

e2. Parallel process status transition circuit for shading process

FIG. 12 shows an example of the parallel process status transition circuit for controlling the hardware shown in FIG. 11. In the parallel process status transition circuit, the aforementioned four basic circuits are used. By referring to FIGS. 12 and 11, a computation control of an embodiment of the present invention will be described in the following.

In FIG. 12, an external trigger pulse EXTRG is given to an input terminal 101. The external trigger pulse EXTRG is transferred to each basic circuit structuring the parallel process status transition circuit. At the time, a trigger signal for controlling each section of the hardware is output.

In other words, after the external trigger pulse EXTRG from the input terminal 101 is supplied to a delay circuit 102, with a delay of a predetermined time period, a trigger signal is output from the delay circuit 102. This trigger signal is a select signal SEL ABC. The select signal SEL ABC causes the multiplexers 15 and 16 (shown in FIG. 11) to be switched to the position a and the multiplexer 18 to be switched to the position a, respectively. The value of the lower left vertex is subtraced from the value of the upper left vertex by the subtracter 17 and then the resultant value is set to divider 19.

The trigger signal from the delay circuit 102 is supplied to an A input terminal of a jump circuit 103. A null determination signal Null is supplied to an S input terminal of the jump circuit 103. When there is a vertex on the left side (see FIG. 7), a trigger pulse is output from an O1 output terminal of the jump circuit 103. This trigger pulse is a division trigger signal DIV TRG. The division trigger signal DIV TRG causes the divider 19 shown in FIG. 11 to start a division. Thus, the variation in the vertical direction on the left side is obtained. When there is no vertex on the left side and thus the vertex on the left side is null, a trigger pulse is output from an O2 output terminal of the jump circuit 103 and is then supplied to a delay circuit 105.

The trigger pulse from the O1 output terminal of the jump circuit 103 is supplied to an A input terminal of a wait circuit 104. A division end signal DIV END is supplied to a B input terminal of the wait circuit 104. When the division is completed by the divider 19 and the variation in the vertical direction on the left side is obtained, the divider 19 generates the division end signal DIV END. When the division end signal DIV END occurs, the wait circuit 104 outputs a trigger pulse. This trigger pulse is a DDA set signal DDA SET A. The DDA set signal DDA SET A causes the variation in the vertical direction on the left side, obtained by the divider 19, to be set to the DDA computation circuit 20 with the left side compensating computation function.

The trigger pulse which is output from the wait circuit 104 is supplied to an I1 input terminal of a join circuit 106. The trigger pulse which is output from the delay circuit 105 is supplied to an I2 input terminal of the join circuit 106. When the trigger pulse from the wait circuit 104 is given to the I1 input terminal of the join circuit 106 or the trigger pulse from the delay circuit 105 is given to the I2 input terminal of the join circuit 106, a trigger pulse is output from the join circuit 106. This trigger pulse is a select signal SEL AB. The select signal SEL AB causes the multiplexers 15 and 16 to be switched to the position b. Thus, the value of the lower right vertex is subtracted from the value of the upper right vertex and then the resultant value is set to the divider 19.

The trigger signal from the join circuit 106 is supplied to an A input terminal of a jump circuit 107. The null determination signal Null is supplied to an S input terminal of the jump circuit 107. When there is a vertex on the right side, a trigger pulse is output from an O1 output terminal of the jump circuit 107. This trigger pulse is a division trigger signal DIV TRG. The division trigger signal DIV TRG causes the divider 19 to start a division. Thus, the variation in the vertical direction on the right side is obtained. When there is no vertex on the right side and thereby the vertex on the right side is null, a trigger pulse is output from an O2 output terminal of the jump circuit 107. This trigger pulse is supplied to a delay circuit 109.

The trigger pulse from the O1 output terminal of the jump circuit 107 is supplied to an A input terminal of the wait circuit 108. The division end signal DIV END is supplied to a B input terminal of the jump circuit 107. When the division is completed by the divider 19 and the variation in the vertical direction on the right side is obtained, the divider 19 generates the division end signal DIV END. When the division end signal DIV END occurs, the wait circuit 108 outputs a trigger pulse. The trigger pulse is a DDA set signal DDA SET B. The DDA set signal DDA SET B causes the variation in the vertical direction on the right side, which was obtained in the divider 19, to be set to the DDA computation circuit 21 with the right side compensating computation function.

The trigger pulse which is output from the wait circuit 108 is supplied to an I1 input terminal of the join circuit 109 is supplied to an I2 input terminal of the join circuit 110. When the trigger pulse from the wait circuit 108 is given to the I1 input terminal of the join circuit 110 or the trigger pulse from the delay circuit 109 is given to the I2 input terminal of the join circuit 110, a trigger pulse is output from the join circuit 110. This trigger pulse is a DDA compensating computation trigger signal DDA TRG AB. The DDA compensating computation trigger signal DDT TRG AB causes the DDA computation circuit 20 with the left side compensating computation function and the DDA computation circuit 21 with the right side compensating computation function to be triggered and the left side compensating computation and the right side compensating computation to be started, respectively. By these compensating computations, the left end value and the right end value of the scan line are obtained.

The trigger pulse which is output from the join circuit 110 is supplied to an A input terminal of a wait circuit 111. A compensating computation end signal AJST END is supplied to a B input terminal of the wait circuit 111. When the left side compensating computation and the right side compensating computation are completed by the DDA computation circuit 20 with the left side compensating computation function and the DDA computation circuit 21 with the right side compensating computation function, respectively, they generate the compensating computation end signal AJST END. When the compensating computation end signal AJST END occurs, the wait circuit 111 outputs a trigger pulse.

The trigger pulse which is output from the wait circuit 111 is supplied to an I1 input terminal of a join circuit 112. A trigger pulse which is output from a wait circuit 117 is supplied to an I2 input terminal of the join circuit 112. When the trigger pulse from the wait circuit 111 is given to the I1 input terminal of the join circuit 112 or the trigger pulse from the jump circuit 107 is given to the I2 input terminal of the join circuit 112, a trigger pulse is output from the join circuit 112. This trigger pulse is a select signal SEL C. The select signal SEL C causes the multiplexer 18 shown in FIG. 1 to be switched to the position b.

When the multiplexer 18 is switched to the position b, the variation in the horizontal direction, which was obtained by the subtracter 22, is set to the divider 19.

The trigger pulse which is output from the join circuit 112 is supplied to a delay circuit 113. By the delay circuit 113, the trigger pulse is delayed for a predetermined time period. After that, the delay circuit 113 outputs a trigger pulse. This trigger pulse is the division trigger signal DIV TRG. The division trigger signal DIV TRG causes the divider 19 to start a division.

The trigger pulse which is output from the delay circuit 113 is supplied to an A input terminal of an wait circuit 114. The division end signal DIV END is supplied to a B input terminal of the wait circuit 114. When the division is completed by the divider 19 and the variation in the horizontal direction is obtained, the divider 19 generates the division end signal DIV END. When the division end signal DIV END occurs, the wait circuit 114 outputs a trigger pulse. This trigger pulse is a DDA set signal DDA SET H. The DDA set signal DDA SET H causes the variation in the horizontal direction, which was obtained by the divider 19, to be set to the DDA computation circuit 23 with the horizontal compensating computation function.

The trigger pulse which is output from the wait circuit 114 is supplied to a delay circuit 115. The trigger pulse is delayed by the delay circuit 115 for a predetermined time period. After the predetermined time period elapsed, the delay circuit 115 outputs a trigger pulse. This trigger pulse is a DDT compensating computation trigger signal DDA TRG H. The DDT compensating computation trigger signal DDA TRG H causes the DDA computation circuit 23 with the horizontal compensating computation function to be triggered and the horizontal compensating computation to be started. By the DDA compensating computation, the value of the coordinate grid point at the left end of the scan line can be obtained.

The trigger pulse which is output from the delay circuit 115 is supplied to an A input terminal of the wait circuit 116. The compensating computation end signal AJST END is supplied to a B input terminal of the wait circuit 116. When the horizontal compensating computation is completed by the DDA computation circuit 23 with the horizontal compensating computation function, the DDA computation circuit 23 with the horizontal compensating computation function generates the compensating computation end signal AJST END. When the compensating computation end signal AJST END occurs, the wait circuit 116 outputs a trigger pulse. This trigger pulse is a DDA computation trigger signal DDA H INC. The DDA computation trigger signal DDA H INC causes the DDA computation circuit 23 with the horizontal compensating computation function to repeat the DDA computation. Thus, the value of each coordinate grid point of the scan line can be obtained.

The trigger signal which is output from the wait circuit 116 is supplied to an A input terminal of a wait circuit 117. An signal END OF LINE for representing the end of the line is supplied to a B input terminal the wait circuit 117. When the value of the coordinate grid point at the last of the line is obtained, the signal END OF LINE for representing the last end of the line occurs. When the signal END OF LINE occurs, the wait circuit 117 outputs a trigger pulse. This trigger pulse is a DDA computation trigger signal DDA AB INC. The DDA computation trigger signal DDA AB INC causes the DDA computation circuit 20 with the left side compensating computation function and the DDA computation circuit 21 with the right side compensating computation function to conduct the DDA computations so as to obtain the left end value and the right end value of the next scan line, respectively.

An output pulse from the wait circuit 117 is supplied to an I2 input terminal of the join circuit 112. After that, the next line is processed.

According to the present invention, by the compensating computation in the vertical direction on the left side and that in the vertical direction on the right side cause values at the left and right ends of a scan line to be obtained. By using the values at the left end and right end of the scan line, the compensating computation in the horizontal direction causes a precise pixel value at the start point at a coordinate grid point close to the left end of the scan line to be obtained. By repeating the DDA computation in the horizontal direction against the pixel value at the start point, the precise pixel value on each scan line can be obtained. The values of the left end and right end of the next scan line can be obtained by the DDA computation where the variation in the vertical direction on the left side and that in the vertical direction on the right side are added to the left end value and the right end value of the former scan line, respectively.

Since accurate pixel values at coordinate grid points are input, the shading has a high accuracy and smoothly accords with motions of a three-dimensional object and a light source in the real time base without flickering of the screen.

The shading circuit is controlled by a parallel process status transition circuit structured by four types of basic circuits, wait circuits, jump circuits, join circuits and delay circuits. By using the parallel process status transition circuit, the data flow can be easily understood and a parallel process with a high maintainability can be conducted.

Although various minor changes and modifications might be proposed by those skilled in the art, it will be understood that we wish to include within the claims of the patent warranged hereon all such changes and modifications as reasonably come within our contribution to the art.

What is claimed is:

1. A shading method for approximating a three-dimensional curved surface for computer graphics wherein shading of a two-dimensional surface is provided by varying pixel brightness values to indicate a depth dimension on the two-dimensional surface, comprising the steps of:

approximating the three-dimensional curved surface by employing a plurality of polygons with each polygon approximating a portion of the curved surface, and wherein each polygon is defined as at least one or more trapezoids;

providing a coordinate grid extending in horizontal and vertical directions with each grid point thereof representing a pixel whose brightness level is to be varied in accordance with said depth dimension and wherein scanning occurs across scan lines in a horizontal direction across the grid from grid point to grid point and parallel to parallel sides of the trapezoids;

providing the trapezoids on the coordinate grid so that addresses of vertices of the trapezoids can be determined in the coordinate grid, said vertices lying at any point not necessarily lying directly on a grid point at a pixel, and providing brightness values at each of the vertices;

determining brightness values of respective pixels at grid points of the coordinate grid lying inside each of the trapezoids by linear interpolation based on addresses and brightness values of the trapezoid vertices which may not necessarily be on a grid point; and where a distance in a vertical direction of the trapezoid is less than a predetermined value causing a side to be nearly horizontal, replacing the nearly horizontal side with a vertical side which starts with one of the end points of the side which is nearly horizontal.

2. A method according to claim 1 comprising the further steps of:

conducting a first compensating computation in a vertical direction of the coordinate grid by employing each of the vertex brightness values and addresses of the trapezoids at opposite sides of the trapezoids running in a primarily vertical direction so as to compute brightness values at left and right end points of a scan line intersecting said primarily vertical left and right sides of the trapezoid; and conducting a second compensating computation in a horizontal direction of said scan line by use of the left and right end point brightness values so as to determine brightness values at each coordinate grid point pixel on said scan line intermediate the left and right points.

3. A method according to claim 2 wherein said vertical compensating includes finding left and right end points of additional scan lines by linear interpolation, and for each scan line using linear interpolation to determine pixel brightness values of pixels on the respective scan line based on the left and right end point brightness values.

4. A method according to claim 1 wherein at least one of said trapezoids is simplified as a triangle since only one vertex lies on a corresponding line parallel to the scan lines.

5. A shading system for approximating a three-dimensional curved surface for computer graphics wherein shading of a two-dimensional surface is provided by varying pixel brightness values to indicate a depth dimension on the two dimensional surface, comprising:

means for approximating the three-dimensional curved surface by employing a plurality of polygons with each polygon being employed approximating a portion of the curved surface, and wherein each polygon is defined as at least one or more trapezoids;

a coordinate grid extending in horizontal and vertical directions with each grid point thereof representing a pixel whose brightness level is to be varied in accordance with said depth dimension and wherein scanning occurs across scan lines in a horizontal direction across the grid from grid point to grid point and parallel to parallel sides of the trapezoids;

means for providing the trapezoids on the coordinate grid so that addresses of vertices of the trapezoids can be determined in the coordinate grid, said vertices not necessarily lying directly on a grid point at a pixel, and providing brightness values at each of the vertices;

means for determining brightness values of respective pixels at grid points of the coordinate grid lying inside each of the trapezoids by linear interpolation based on addresses and brightness values of the vertices which may not necessarily lie at a grid point; and where a distance in a vertical direction of the trapezoid is less than a predetermined value causing a side to be nearly horizontal, means for replacing the nearly horizontal side with a vertical side which starts with one of the end points of the side which is nearly horizontal.

6. A system according to claim 5 further comprising:

means for conducting a first compensating computation in a vertical direction of the coordinate grid by employing each of the vertex brightness values and addresses of the trapezoids at opposite sides of the trapezoids running in a primarily vertical direction so as to compute brightness values at left and right end points of a scan line intersecting said primarily vertical left and right sides of the trapezoids; and means for conducting a second compensating computation in a horizontal direction of said scan line by use of the left and right end point brightness values so as to determine brightness values at each coordinate grid point pixel on said scan line intermediate the left and right end points.

7. A shading system according to claim 5 wherein at least one of said trapezoids is simplified as a triangle since only one vertex lies on a corresponding line parallel to the scan lines.

* * * * *